United States Patent
Schotten et al.

(10) Patent No.: US 8,340,216 B2
(45) Date of Patent: *Dec. 25, 2012

(54) SPACE-TIME SCRAMBLING FOR CELLULAR SYSTEMS

(75) Inventors: Hans Dieter Schotten, Nuremberg (DE); Jay Rodney Walton, Carlisle, MA (US)

(73) Assignee: Qualcomm Incorporated, San Diego, CA (US)

( * ) Notice: Subject to any disclaimer, the term of this patent is extended or adjusted under 35 U.S.C. 154(b) by 811 days.

This patent is subject to a terminal disclaimer.

(21) Appl. No.: 11/367,094

(22) Filed: Mar. 3, 2006

(65) Prior Publication Data

US 2007/0177732 A1    Aug. 2, 2007

Related U.S. Application Data

(60) Provisional application No. 60/663,504, filed on Mar. 18, 2005, provisional application No. 60/710,502, filed on Aug. 22, 2005.

(51) Int. Cl.
*H03K 9/00* (2006.01)

(52) U.S. Cl. ........ 375/316; 375/267; 375/296; 375/148; 375/346

(58) Field of Classification Search .................... 375/316
See application file for complete search history.

(56) References Cited

U.S. PATENT DOCUMENTS

| 5,499,272 A | 3/1996 | Bottomley |
| 5,760,700 A * | 6/1998 | Ellis ........................... 340/5.26 |
| 6,775,260 B1 | 8/2004 | Dabak et al. |
| 6,804,307 B1 | 10/2004 | Popovic |
| 7,020,176 B2 * | 3/2006 | Heo ............................ 375/130 |
| 7,136,427 B2 * | 11/2006 | Niida et al. ................... 375/299 |
| 7,349,540 B2 * | 3/2008 | Dick et al. .................... 380/210 |
| 2002/0196842 A1 * | 12/2002 | Onggosanusi et al. ....... 375/148 |
| 2004/0002364 A1 | 1/2004 | Trikkonen et al. |
| 2004/0120274 A1 * | 6/2004 | Petre et al. .................... 370/320 |
| 2004/0131009 A1 * | 7/2004 | Pappalardo et al. .......... 370/208 |

(Continued)

FOREIGN PATENT DOCUMENTS

EP    1009124 A2    6/2000

(Continued)

OTHER PUBLICATIONS

International Search Report—PCT/US2006/010084, International Search Authority—European Patent Office—Aug. 24, 2006.

(Continued)

*Primary Examiner* — Lihong Yu

(74) *Attorney, Agent, or Firm* — Qualcomm Patent Group; James H. Yancey, Jr.

(57) ABSTRACT

Techniques for transmitting data with space-time scrambling in cellular systems (e.g., CDMA systems) are described. At least one stream of data symbols is generated, mapped to one or more physical channels, and spread with channelization codes for the physical channels. Space-time scrambling is performed on the at least one stream of data symbols to generate at least two streams of output chips. The space-time scrambling may be achieved by performing matrix multiplication with a sequence of matrices. For each time interval in which space-time scrambling is performed, a matrix may be selected (e.g., based on a scrambling code for a base station), and data to be sent in the time interval is multiplied with the selected matrix. The matrices used for space-time scrambling may be defined and selected in various manners. The streams of output chips are processed and transmitted from respective transmit antennas.

44 Claims, 8 Drawing Sheets

U.S. PATENT DOCUMENTS

2005/0163245 A1* 7/2005 Sandell .................. 375/267

FOREIGN PATENT DOCUMENTS

| | | |
|---|---|---|
| EP | 1223702 A1 | 7/2002 |
| EP | 1555768 | 7/2005 |
| GB | 2409617 A | 6/2005 |
| JP | 2000031939 A | 1/2000 |
| JP | 2001525630 | 12/2001 |
| JP | 2002538661 T | 11/2002 |
| JP | 2003152610 A | 5/2003 |
| JP | 2006514520 T | 4/2006 |
| RU | 2114513 C1 | 6/1998 |
| RU | 2238611 C1 | 10/2004 |
| TW | 511384 | 11/2002 |
| TW | 588911 | 5/2004 |
| TW | 589817 | 6/2004 |
| WO | WO0156218 A1 | 2/2001 |
| WO | 2006102254 | 9/2006 |

OTHER PUBLICATIONS

International Preliminary Report Patentability—PCT/US2006/010084, International Search Authority—The International Bureau of WIPO—Sep. 18, 2007.

Written Opinion—PCT/US2006/010084, International Search Authority—European Patent Office—Sep. 18, 2007.

Medles et al. "Multistream Space-Time Coding by Spatial Spreading, Scrambling and Delay Diversity." 2002 IEEE International Conference on Acoustics, Speech, and Signal Processing. Proceedings. (ICASSP). Orlando, FL, May 13-17, 2002, IEEE International Conference on Acoustics, Speech, and Signal Processing (ICASSP), New York, NY: IEEE, US, vol. 4 of 4, May 13, 2002, pp. III-2429 to III-2432.

Liu, "The Methods to Enhance 3G/ Beyond 3G/ Wireless LAN Transmission Rate and Efficiency", pp. 1-73.

Taiwanese Search report—095109269—TIPO—Sep. 19, 2009.

* cited by examiner

SPACE-TIME SCRAMBLING FOR CELLULAR SYSTEMS

CLAIM OF PRIORITY UNDER 35 U.S.C. §119

The present Application for Patent claims priority to Provisional Application Ser. No. 60/663,504, entitled "Space-Time Scrambling for Cellular Systems," filed Mar. 18, 2005, and Provisional Application Ser. No. 60/710,502, entitled "Space-Time Scrambling for Cellular Systems," filed Aug. 22, 2005, both assigned to the assignee hereof, and expressly incorporated herein by reference.

BACKGROUND

I. Field

The present disclosure relates generally to communication, and more specifically to techniques for transmitting data in cellular systems.

II. Background

A cellular system is a wireless multiple-access communication system that can concurrently communicate with multiple terminals, e.g., cellular phones. A cellular system may utilize a multiple-access technique such as Code Division Multiple Access (CDMA), Time Division Multiple Access (TDMA), Frequency Division Multiple Access (FDMA), or Orthogonal Frequency Division Multiple Access (OFDMA).

A cellular system often employs multiple antennas to achieve higher throughput and/or greater reliability for data transmission on the downlink to the terminals. A terminal may estimate the downlink channel response and may send feedback information to a base station. The base station may then spatially process the data transmission for the terminal based on the feedback information. For example, the base station may perform beamforming in order to steer the data transmission toward the terminal.

Spatial processing based on feedback information (e.g., beamforming) may be undesirable for several reasons. First, overhead is incurred to send the feedback information from the terminal to the base station. Second, feedback-based spatial processing for the recipient terminals may degrade the performance of other terminals communicating with other base stations. The data transmission to the recipient terminals causes interference to the other terminals, and the spatial processing based on the feedback information may result in the interference being unpredictable to these other terminals. The unpredictable fluctuation in the interference observed by these other terminals may degrade both the accuracy of their measurements of the wireless channels and the predictability of the channel properties. The reduced measurement accuracy and channel predictability degrade link adaptation for these other terminals.

There is therefore a need in the art for techniques to transmit data in cellular systems.

SUMMARY

Techniques for transmitting data with space-time scrambling in cellular systems (e.g., CDMA systems) are described herein. Space-time scrambling refers to the processing of a data stream in a time-variant but deterministic manner such that the data stream is sent via multiple antennas and achieves diversity and possibly other desirable benefits. Depending on the manner in which space-time scrambling is performed, diversity may be achieved over spatial domain or both spatial and temporal domains. Space-time scrambling may be used to implement various multiple-input multiple-output (MIMO) and multiple-input single-output (MISO) transmission schemes. MIMO transmission schemes are characterized by the mapping of one or multiple data streams to multiple antennas. Space-time scrambling may also be used for various applications such as, e.g., High-Speed Downlink Packet Access (HSDPA) in the 3GPP W-CDMA standard.

According to an embodiment of the invention, an apparatus (e.g., for a base station) is described which includes a processor and at least two transmitter units. The processor generates at least one stream of data symbols and performs space-time scrambling on the at least one stream of data symbols (e.g., by performing matrix multiplication with a sequence of matrices) to generate at least two streams of output chips. The transmitter units transmit the at least two streams of output chips from at least two antennas to at least one receiver (e.g., for at least one terminal) in a cellular system.

According to another embodiment, a method is provided in which at least one stream of data symbols is generated. Space-time scrambling is performed on the at least one stream of data symbols to generate at least two streams of output chips. The at least two streams of output chips are transmitted from at least two antennas to at least one receiver in a cellular system.

According to yet another embodiment, an apparatus is described which includes means for generating at least one stream of data symbols, means for performing space-time scrambling on the at least one stream of data symbols to generate at least two streams of output chips, and means for transmitting the at least two streams of output chips from at least two antennas to at least one receiver in a cellular system.

According to yet another embodiment, an apparatus is described which includes a processor and a memory. The processor generates at least one stream of data symbols for at least one terminal in a wireless communication system and performs space-time scrambling on the at least one stream of data symbols with a sequence of matrices to generate at least two streams of output chips for transmission via at least two antennas. Neighboring base stations in the wireless communication system use different sequences of matrices for space-time scrambling.

According to yet another embodiment, a method is provided in which at least one stream of data symbols is generated for at least one terminal in a wireless communication system. Space-time scrambling is performed on the at least one stream of data symbols with a sequence of matrices to generate at least two streams of output chips for transmission via at least two antennas. Neighboring base stations use different sequences of matrices for space-time scrambling.

According to yet another embodiment, an apparatus is described which includes means for generating at least one stream of data symbols for at least one terminal in a wireless communication system and means for performing space-time scrambling on the at least one stream of data symbols with a sequence of matrices to generate at least two streams of output chips for transmission via at least two antennas. Neighboring base stations use different sequences of matrices for space-time scrambling.

According to yet another embodiment, an apparatus is described which includes a processor and a memory. The processor generates at least one stream of data symbols for at least one terminal, maps the at least one stream of data symbols to at least one physical channel, performs spreading for the at least one physical channel with at least one channelization code to generate at least one stream of data chips, and performs space-time scrambling on the at least one stream of data chips to generate at least two streams of output chips for transmission via at least two antennas. The at least one stream of data symbols may be for HSDPA, and the at least one physical channel may be HS-PDSCH(s).

According to yet another embodiment, a method is provided in which at least one stream of data symbols for at least one terminal is generated and mapped to at least one physical channel. Spreading is performed for the at least one physical channel with at least one channelization code to generate at least one stream of data chips. Space-time scrambling is performed on the at least one stream of data chips to generate at least two streams of output chips for transmission via at least two antennas.

According to yet another embodiment, an apparatus is described which includes means for generating at least one stream of data symbols for at least one terminal, means for mapping the at least one stream of data symbols to at least one physical channel, means for performing spreading for the at least one physical channel with at least one channelization code to generate at least one stream of data chips, and means for performing space-time scrambling on the at least one stream of data chips to generate at least two streams of output chips for transmission via at least two antennas.

According to yet another embodiment, an apparatus is described which includes at least one receiver unit and a processor. The receiver unit(s) receive at least two streams of output chips from a transmitter in a cellular system and generate at least one stream of input samples. The streams of output chips are generated at the transmitter by performing space-time scrambling on at least one stream of data symbols and are transmitted via at least two antennas at the transmitter. The processor performs space-time descrambling on the at least one stream of input samples to obtain at least one stream of descrambled samples and further processes the at least one stream of descrambled samples to obtain an estimate of the at least one stream of data symbols.

According to yet another embodiment, a method is provided in which at least one stream of input samples is obtained for at least two streams of output chips received from a transmitter in a cellular system. Space-time descrambling is performed on the at least one stream of input samples to obtain at least one stream of descrambled samples, which is further processed to obtain an estimate of the at least one stream of data symbols.

According to yet another embodiment, an apparatus is described which includes means for obtaining at least one stream of input samples for at least two streams of output chips received from a transmitter in a cellular system, means for performing space-time descrambling on the at least one stream of input samples to obtain at least one stream of descrambled samples, and means for processing the at least one stream of descrambled samples to obtain an estimate of the at least one stream of data symbols.

Various aspects and embodiments of the invention are described in further detail below.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The transmission techniques described herein may be used for various cellular systems such as CDMA systems, TDMA systems, FDMA systems, OFDMA systems, and so on. A CDMA system may implement one or more CDMA radio access technologies (RATs) such as Wideband-CDMA (W-CDMA), cdma2000, and so on. cdma2000 covers IS-2000, IS-856, and IS-95 standards. A CDMA system may thus be a W-CDMA system or a cdma2000 system. A TDMA system may implement one or more TDMA RATs such as Global System for Mobile Communications (GSM), Digital Advanced Mobile Phone System (D-AMPS), and so on. These various RATs and standards are known in the art. W-CDMA and GSM are described in documents from an organization named "3rd Generation Partnership Project" (3GPP). cdma2000 is described in documents from an organization named "3rd Generation Partnership Project 2" (3GPP2). 3GPP and 3GPP2 documents are publicly available. For clarity, the transmission techniques are described below for a W-CDMA system.

Figure 1:
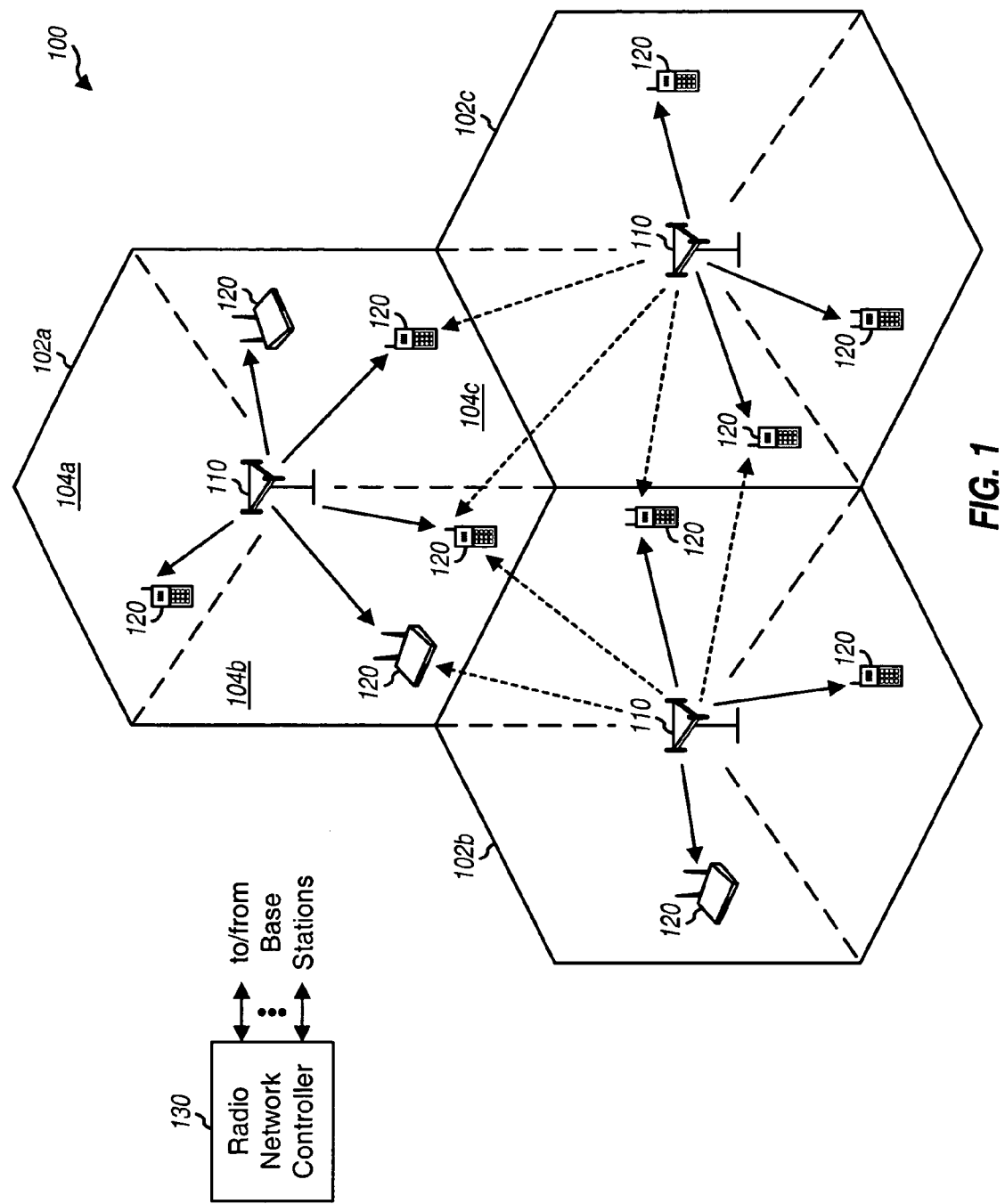
FIG. 1 shows a cellular system.

FIG. 1 shows a cellular system 100 with multiple base stations 110 and multiple terminals 120. A base station is generally a fixed station that communicates with the terminals and may also be called a Node B (3GPP terminology), an access point, or some other terminology. Each base station 110 provides communication coverage for a particular geographic area 102. The term "cell" can refer to a base station and/or its coverage area depending on the context in which the term is used. To improve system capacity, the base station coverage area may be partitioned into multiple smaller areas, e.g., three smaller areas 104a, 104b, and 104c. Each smaller area is served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. A radio network controller 130 couples to base stations 110 and provides coordination and control for these base stations.

A terminal may be fixed or mobile and may also be called a user equipment (UE) (3GPP terminology), a mobile station, a wireless device, or some other terminology. A terminal may be a cellular phone, a personal digital assistant (PDA), a wireless modem card, and so on. A terminal may communicate with zero, one, or multiple base stations on the downlink and uplink at any given moment. The downlink (or forward link) refers to the communication link from the base stations to the terminals, and the uplink (or reverse link) refers to the communication link from the terminals to the base stations. In the following description, a serving base station is a base station with which a terminal communicates. A neighbor base station is a base station from which a terminal may receive pilot and overhead information but not user data.

3GPP supports High-Speed Downlink Packet Access (HSDPA), which is a set of channels and procedures that enables high-speed packet data transmission on the downlink. For HSDPA, a High Speed Downlink Shared Channel (HS-DSCH), which is a transport channel, carries data for individual terminals. The HS-DSCH is processed (e.g., encoded) and mapped to one or more High Speed Physical Downlink Shared Channels (HS-PDSCHs), which are physical channels. The HS-PDSCHs may carry data in a time division multiplexed (TDM) manner or in a TDM and code division multiplexed (CDM) manner to the terminals. Control information for the HS-PDSCHs is sent on one or more Shared Control Channels for the HS-DSCHs (HS-SCCHs), which are physical channels. The control information includes various parameters used by the terminals to properly receive the HS-PDSCHs.

Figure 2:
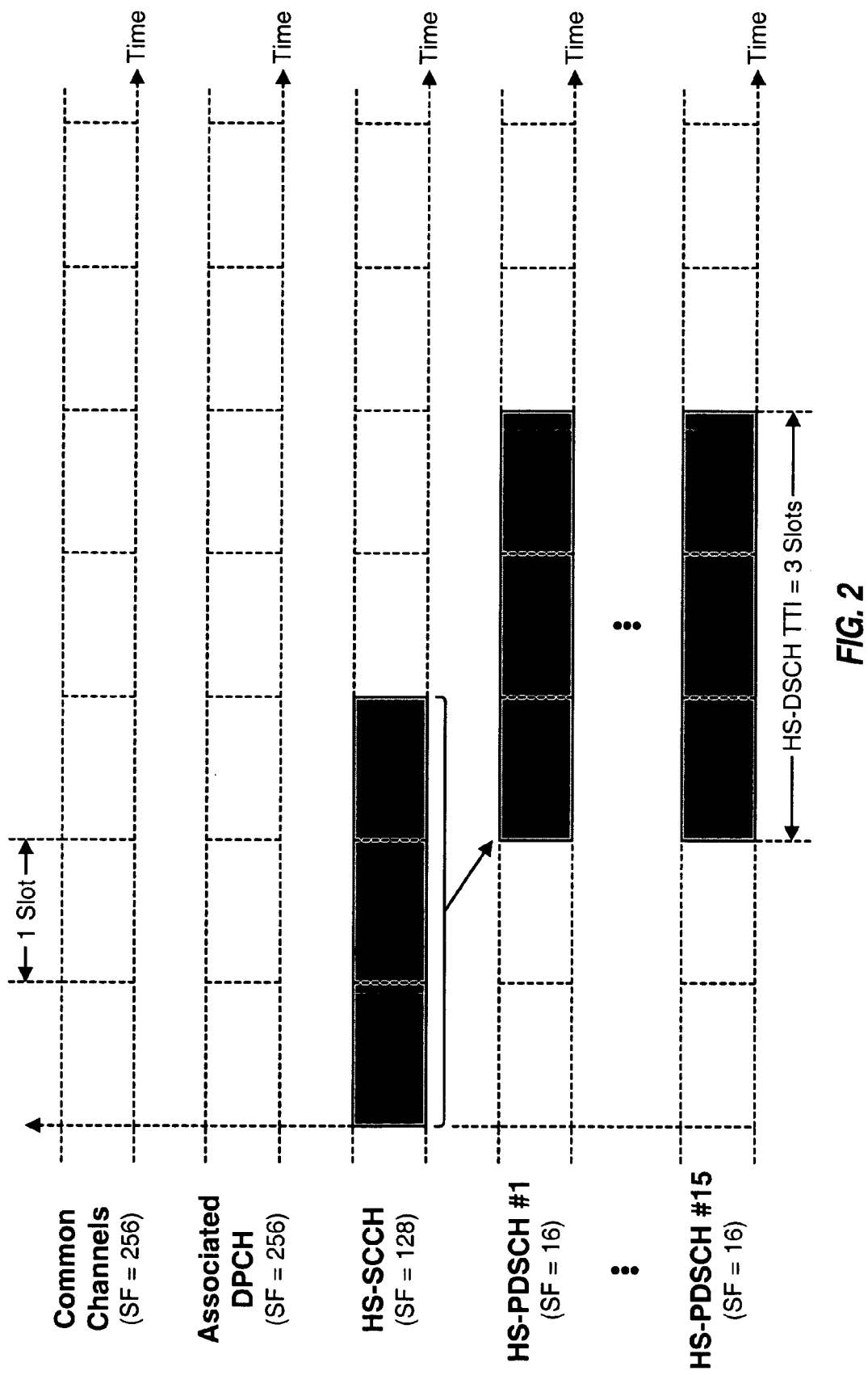
FIG. 2 shows physical channels used for downlink transmission to terminals.

FIG. 2 shows various physical channels used for downlink transmission to the terminals. For 3GPP Release 5, a base station may transmit up to 15 HS-PDSCHs on the downlink for HSDPA. The HS-PDSCHs are shared among all terminals under the coverage of the base station. Each HS-PDSCH is assigned a specific channelization code with a spreading factor of 16 (SF=16). The channelization codes for the HS-PDSCHs and other physical channels in W-CDMA are called orthogonal variable spreading factor (OVSF) codes. A spreading factor of 16 means that the channelization code is a sequence of 16 chips. Data for individual terminals is processed as transport blocks on the HS-DSCH. Each transport block is sent on one or more HS-PDSCHs in one transmission time interval (TTI).

The base station may also transmit up to four HS-SCCHs on the downlink. Each HS-SCCH is assigned a specific channelization code with a spreading factor of 128 (SF=128). The HS-SCCHs are also shared among all terminals and carry control information for the HS-PDSCHs. The control information indicates the channelization codes, the modulation scheme, the recipient terminal for each HS-PDSCH, and other information needed for HS-PDSCH processing at the terminal. The base station sends the control information on the HS-SCCHs two slots ahead of the corresponding packet transmissions on the HS-PDSCHs. The base station may serve one or more terminals in each TTI. A served terminal receives control information from only one HS-SCCH but may receive data from one or multiple HS-PDSCHs.

The HS-PDSCHs and HS-SCCHs for HSDPA are described in various 3GPP documents including TS 25.211, TS 25.212, TS 25.213, TS 25.214, TS 25.308, and TR 25.858, all of which are publicly available.

Each terminal that is receiving HSDPA is also assigned a downlink Dedicated Physical Channel (DPCH), which is called an associated DPCH when used for HSDPA. The associated DPCH may be used to send higher layer control information and power control information to the terminal. The associated DPCH is assigned a specific channelization code with a spreading factor of 256. Each terminal continually monitors its associated DPCH.

Each terminal that is receiving HSDPA also processes common physical channels (or simply, common channels) such as a Primary Common Control Physical Channel (P-CCPCH) and a Common Pilot Channel (CPICH). The common channels are sent to all terminals under the coverage of the base station. The P-CCPCH carries a Broadcast Channel (BCH) that carries system-specific and cell-specific information for the terminals. The timing of the P-CCPCH is used as a time reference for common and shared channels. The frame timing of the CPICH, HS-PDSCHs, and HS-SCCHs is related to the timing of the P-CCPCH. The frame timing of dedicated physical channels (e.g., the associated DPCH) may or may not be aligned with the frame timing of the P-CCPCH. The CPICH carries a pilot that is used by the terminals for various functions such as estimation of the wireless channel response, pilot strength, received signal quality, and so on.

Each common channel is assigned a specific channelization code with a specific spreading factor. For the P-CCPCH and CPICH, the spreading factor is 256.

Table 1 lists some of the downlink physical channels that a terminal may process when receiving HSDPA from a base station. Each physical channel is assigned a specific channelization code. The spreading factors for the different types of physical channels are given in Table 1.

TABLE 1

Downlink Physical Channels

| Physical Channel | Spreading Factor | Max Num of Channels | Description |
|---|---|---|---|
| HS-DPSCH | 16 | 15 per base station | Carry user data for specific terminals. |
| HS-SCCH | 128 | 4 per base station | Carry signaling for the HS-PDSCHs. |
| Associated DPCH | 256 | 1 per terminal | Carry control information for a specific terminal. |
| Common Channels | 256 | 1 set per base station | Carry broadcast and overhead data and pilot from a base station. |

Figure 3:
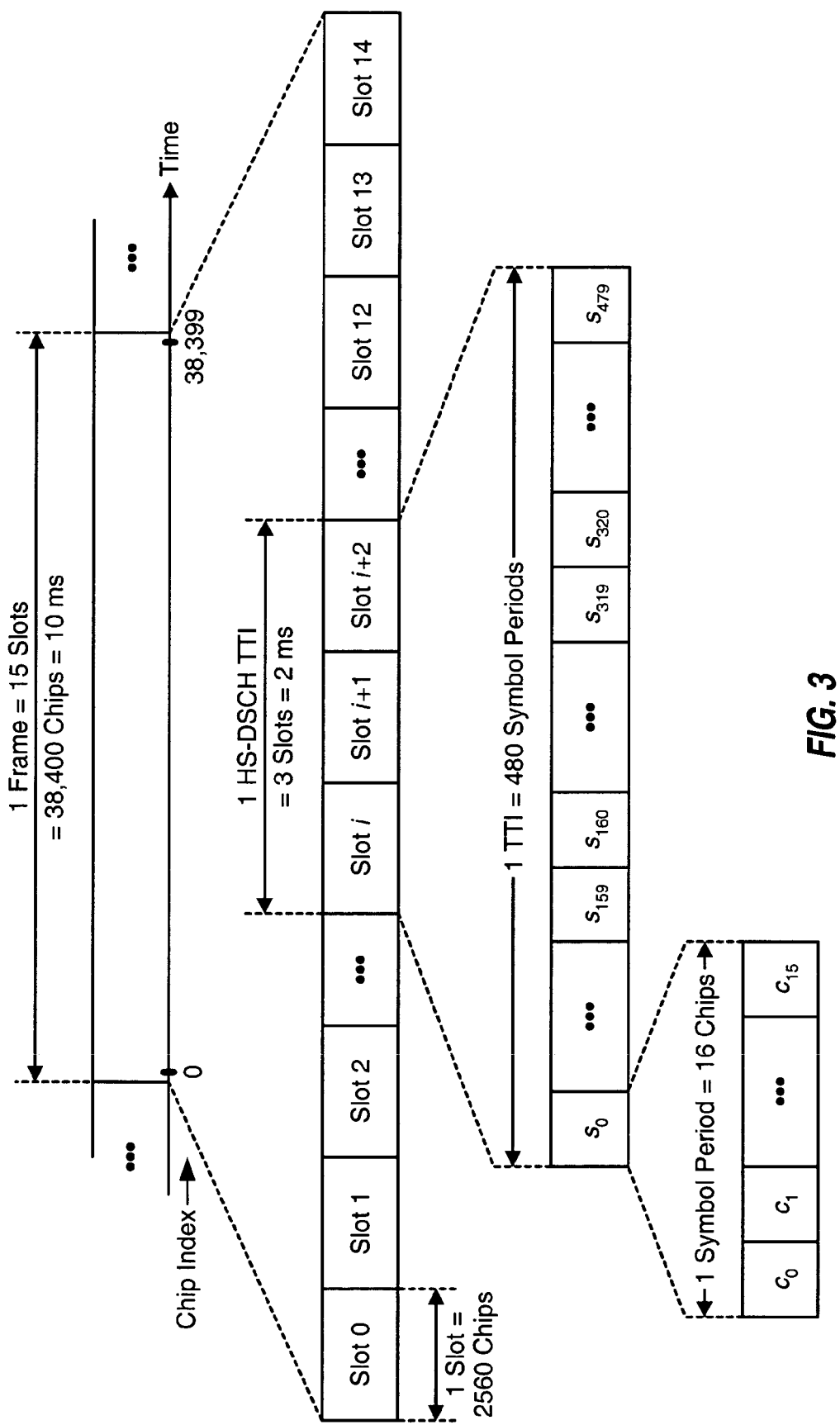
FIG. 3 shows a frame structure for HSDPA.

FIG. 3 shows a frame structure for HSDPA. The timeline for transmission on the downlink is divided into radio frames. Each radio frame is identified by a 12-bit system frame number (SFN) that is transmitted on a control channel. Each radio frame has a duration of 10 milliseconds (ms) and is further partitioned into 15 slots, which are labeled as slot 0 through slot 14. Each slot includes 2560 chips and has a duration of ⅔ ms. Each chip has a duration of 260.42 nanoseconds (ns) for a chip rate of 3.84 megachips/second (Mcps).

The HS-PDSCHs are transmitted in TTIs, which are also called sub-frames. Each TTI spans three slots and has a duration of 2 ms. A new TTI for the HS-PDSCHs starts at the frame boundary. The HS-PDSCHs are assigned channelization codes with spreading factor of 16. Hence, a data symbol is sent on an HS-PDSCH in a symbol period of 16 chips. For the HS-PDSCHs, each TTI includes 480 symbol periods, and each symbol period includes 16 chips. A data symbol may be a modulation symbol for data. Data symbols may be spread with a channelization code to generate output chips.

Figure 4:
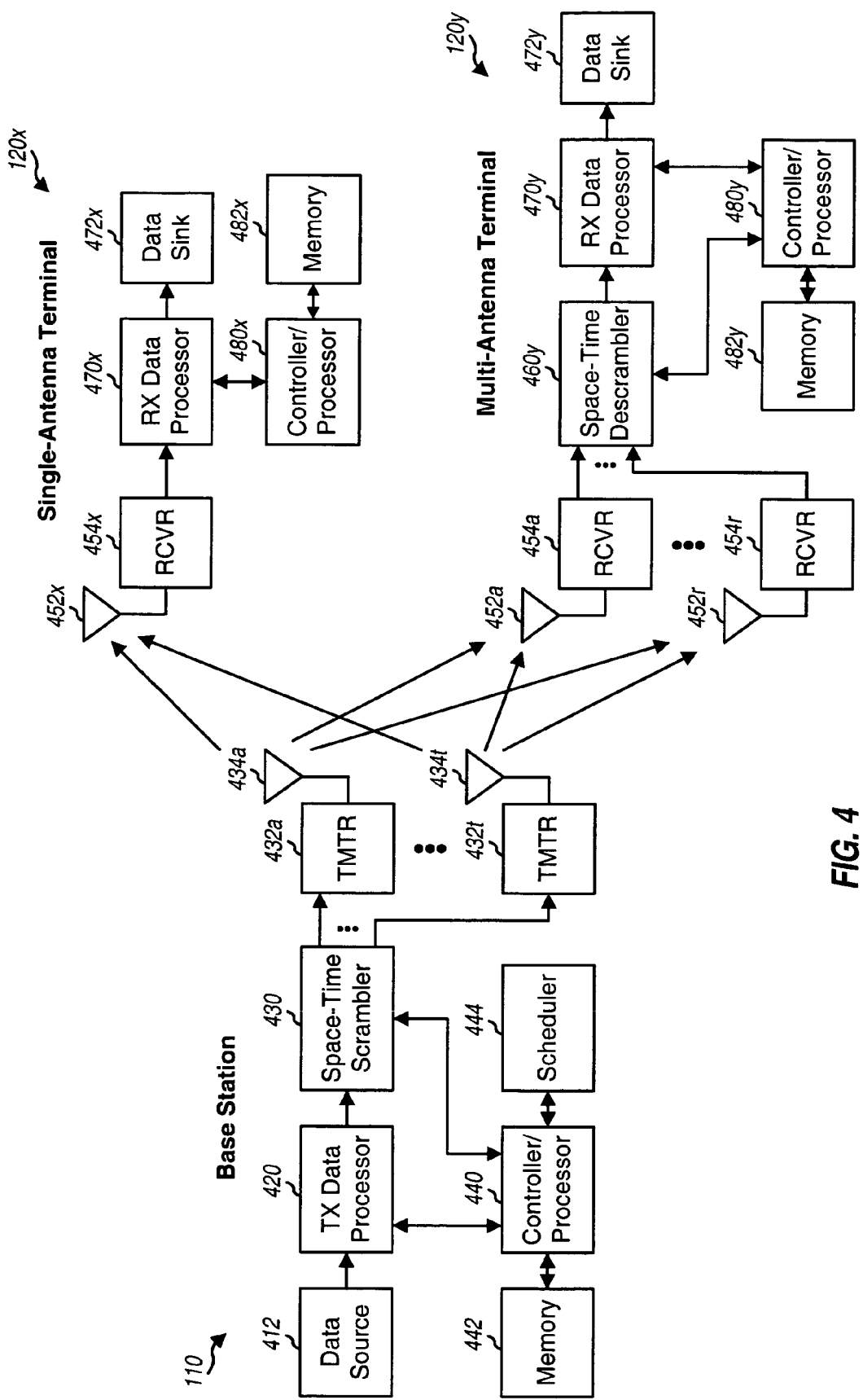
FIG. 4 shows a block diagram of a base station and two terminals.

FIG. 4 shows a block diagram of an embodiment of base station 110 and two terminals 120x and 120y in cellular system 100. Base station 110 is equipped with multiple (T) antennas 434a through 434t, terminal 120x is equipped with a single antenna 452x, and terminal 120y is equipped with multiple (R) antennas 452a through 452r. For simplicity, FIG. 4 shows only the processing units for downlink transmission from the base station to the terminals.

At base station 110, a TX data processor 420 receives user data (e.g., for HSDPA) from a data source 412 and control and overhead data from a controller/processor 440. TX data processor 420 processes the various types of data and generates one or more (S) streams of data chips. A space-time scrambler 430 performs space-time scrambling on the S streams of data chips and provides multiple (T) streams of output chips to T transmitter units (TMTRs) 432a through 432t. Each transmitter unit 432 processes (e.g., converts to analog, filters, amplifies, and frequency upconverts) its output chip stream and generates a downlink signal. The downlink signals from transmitter units 432a through 432t are transmitted from antennas 434a through 434t, respectively.

At each terminal 120, one or multiple antennas 452 receive the transmitted downlink signals, and each antenna provides a received signal to a respective receiver unit (RCVR) 454.

Each receiver unit 454 processes (e.g., filters, amplifies, frequency downconverts, and digitizes) its received signal and provides a stream of input samples. For multi-antenna terminal 120y, a space-time descrambler 460y performs space-time descrambling on the input samples and provides descrambled samples. For each terminal, a receive (RX) data processor 470 processes the input samples or the descrambled samples, provides decoded user data to a data sink 472, and provides recovered control and overhead data to a controller/processor 480.

Controllers/processors 440, 480x and 480y control the operation of various processing units at base station 110 and terminals 120x and 120y, respectively. Memories 442, 482x and 482y store data and program codes for base station 110 and terminals 120x and 120y, respectively. A scheduler 444 schedules terminals for transmission on the downlink (e.g., for HSDPA) and on the uplink.

Figure 5A:
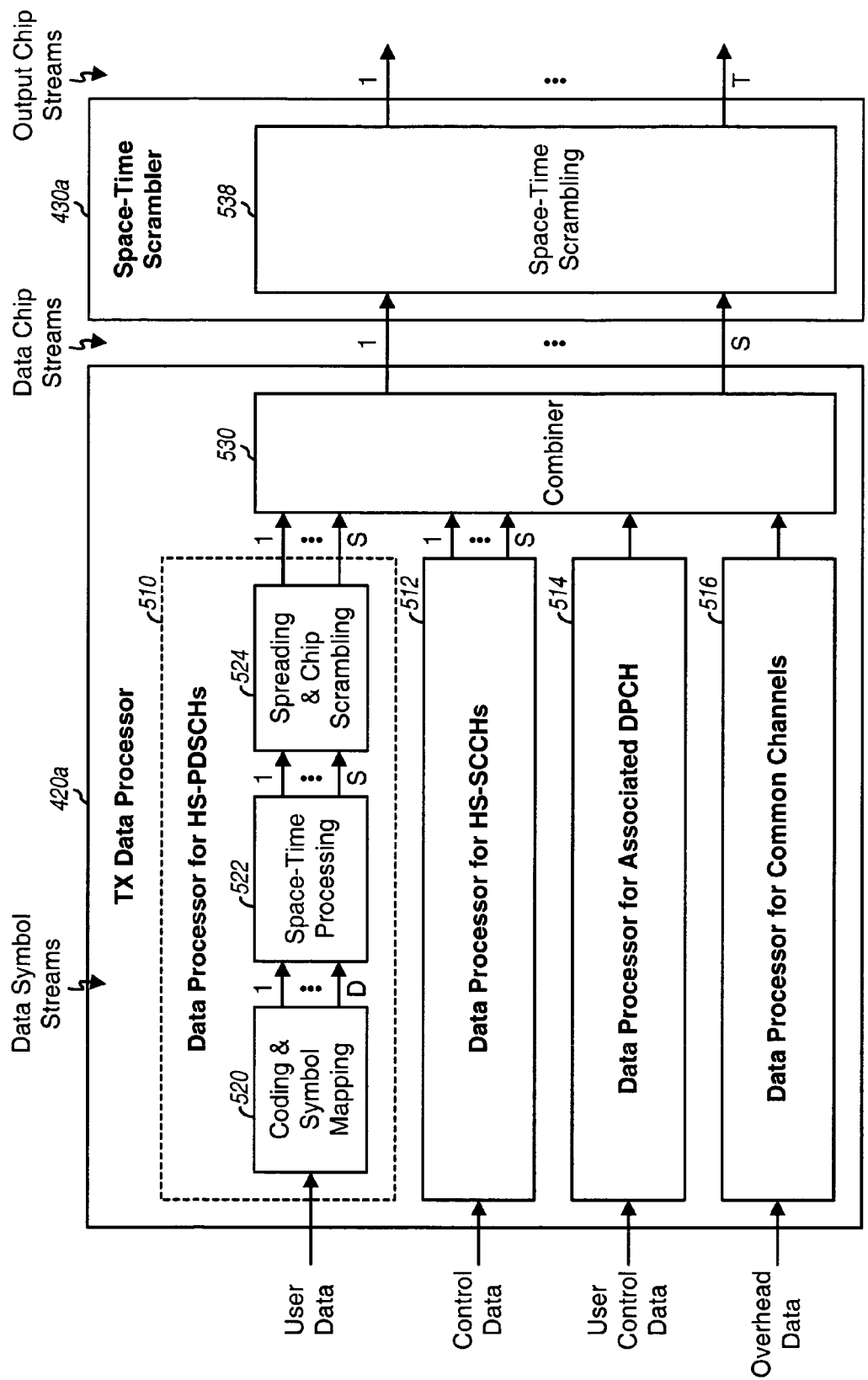
FIGS. 5A and 5B show block diagrams for two embodiments of a transmit (TX) data processor and a space-time scrambler.

FIG. 5A shows a block diagram of a TX data processor 420a and a space-time scrambler 430a, which are an embodiment of TX data processor 420 and space-time scrambler 430, respectively, at base station 110 in FIG. 4. For this embodiment, TX data processor 420a includes a data processor 510 for the HS-PDSCHs, a data processor 512 for the HS-SCCHs, a data processor 514 for the associated DPCH, and a data processor 516 for the common channels (e.g., the P-CCPCH and CPICH). TX data processor 420a may also include other data processors for other physical channels, which are not shown in FIG. 5A for simplicity.

Within data processor 510 for the HS-PDSCHs, a coding and symbol mapping unit 520 receives user data to be sent to the terminals and demultiplexes the user data into D data streams to be transmitted in parallel, where in general $D \geq 1$. Unit 520 processes each data stream and provides a corresponding stream of data symbols. The processing by unit 520 may include CRC attachment, bit scrambling, channel encoding (e.g., with a Turbo code, a convolutional code, a block code, and so on), rate matching, interleaving, symbol mapping (or modulation), and so on. Unit 520 may process each data stream in accordance with fixed coding and modulation schemes. Alternatively, unit 520 may process each data stream in accordance with adaptive coding and modulation schemes, which may be selected based on feedback received from the recipient terminals.

The number of independent data streams ($D_u$) that may be sent simultaneously to a given terminal u is determined by the number of antennas (T) at the base station and the number of antennas ($R_u$) at terminal u, or $D_u \leq \min \{T, R_u\}$. Hence, base station 110 may send one or multiple data streams to a served terminal.

A space-time processing unit 522 receives D data symbol streams from unit 520, performs space-time processing, and provides S output symbol streams, where in general $1 \leq S \leq T$ and typically $S \geq D$. In an embodiment, unit 522 provides each data symbol stream as an output symbol stream, and each output symbol is equal to a data symbol. In another embodiment, unit 522 implements space-time transmit diversity (STTD) and maps each data symbol stream into two output symbol streams. Unit 522 may perform STTD as follows. For each pair of data symbols, $\{s_a \text{ and } s_b\}$, to be sent in two symbol periods for a given data symbol stream, unit 522 generates two symbol pairs, $\{s_a \text{ and } s_b\}$ and $\{-s_b^* \text{ and } s_a^*\}$, where "*" denotes a complex conjugate. Unit 522 then maps the first symbol pair $\{s_a \text{ and } s_b\}$ onto the first output symbol stream and maps the second period pair $\{-s_b^* \text{ and } s_a^*\}$ onto the second output symbol stream. The second output symbol stream thus contains all of the data symbols sent in the first output symbol stream. However, the output symbols in the second stream are reordered and conjugated and/or negated, which allows a recipient terminal to optimally combine the received symbols. Unit 522 may perform STTD in other manners. Unit 522 may also perform space-time processing based on other space-time diversity schemes.

Unit 522 may map each data symbol stream to one or multiple output symbol streams. In an embodiment, which is assumed for the description below, the S output symbol streams from unit 522 are sent simultaneously from S virtual antennas, one output symbol stream from each virtual antenna. In another embodiment, multiple output symbol streams may be code division multiplexed and sent from one virtual antenna. In any case, each virtual antenna corresponds to a different spatial channel that is formed with the T transmit antennas at base station 110.

Each output symbol stream may be sent on one or more HS-PDSCHs, or more specifically, on 1 to 15 HS-PDSCHs for 3GPP Release 6. The segmentation of an output symbol stream to HS-PDSCHs, which is called physical channel segmentation, may be performed by various processing units within the transmit path. For example, the physical channel segmentation may be performed by unit 520, 522, 524, 430, and so on. For clarity, the following description assumes that the physical channel segmentation is performed by unit 524.

Spreading and chip scrambling unit 524 receives the S output symbol streams from unit 522, performs spreading and chip scrambling (if applicable), and provides S streams of data chips. Unit 524 may process each output symbol stream as follows. Unit 524 first demultiplexes the output symbol stream into N output symbol substreams to be sent on N HS-PDSCHs, where $1 \leq N \leq 15$. Unit 524 then performs spreading on each output symbol substream with a channelization code assigned to the HS-PDSCH carrying that substream. Unit 524 performs spreading by repeating an output symbol multiple times to generate SF replicated symbols and then multiplying these SF replicated symbols with the SF chips of the assigned channelization code to generate SF chips, where SF=16 for the HS-PDSCH. Unit 524 may scale the N chip streams for the N HS-PDSCHs with the same or different weights and then combine/add the scaled chip streams for all N HS-PDSCHs. Unit 524 may scramble the stream of combined chips with the scrambling code for the base station to generate a stream of data chips for the output symbol stream. The chip scrambling is performed by multiplying each combined chip with a respective chip of the scrambling code. Unit 524 may omit the chip scrambling and provide the stream of combined chips directly as the stream of data chips. Unit 524 may selectively perform chip scrambling, e.g., perform chip scrambling if space-time scrambling is not performed and omit chip scrambling if space-time scrambling is performed.

In general, any number of HS-PDSCHs (up to the number of available HS-PDSCHs) may be sent from each virtual antenna, and the symbols for these HS-PDSCHs may be spread with the assigned channelization codes, combined, and possibly chip scrambled to generate the data chip stream for that virtual antenna. The spreading and chip scrambling for each virtual antenna may be performed independently. The same or different numbers of HS-PDSCHs and the same or different HS-PDSCHs may be sent from the S virtual antennas. It may be advantageous to cycle through all of the available channelization codes for the HS-PDSCHs as few times as possible across the S virtual antennas, so that each channelization code is used for as few virtual antennas as possible. This helps to orthogonalize the S streams being sent simultaneously from the virtual antennas.

Data processor 510 may perform channel coding, modulation, space-time processing, spreading, and chip scrambling in other manners. For example, the symbol mapping may be performed in unit 524.

Data processor 512 processes control data for the HS-PDSCHs, which is sent on the HS-SCCHs. Data processor 512 may provide one data chip stream for each virtual antenna or one data chip stream for each data chip stream provided by data processor 510. Data processor 514 processes control data for each terminal, which is sent on the associated DPCH. Data processor 516 processes overhead data for the radio access system, which is sent on the P-CCPCH. Data processor 516 also performs processing for the CPICH and other common channels. Data processors 512, 514 and 516 may perform processing for the HS-SCCHs, the associated DPCH, and the common channels (e.g., the P-CCPCH and CPICH), respectively, as specified by 3GPP. In general, the data for each physical channel may be sent from zero, one, multiple, or all S virtual antennas.

A combiner 530 receives the data chip streams from data processors 510, 512, 514 and 516, combines the data chip streams for each virtual antenna, and provides S combined data chip streams for the S virtual antennas. The data processing and combining may also be performed in other manners.

Space-time scrambler 430a includes a space-time scrambling unit 538 that performs space-time scrambling for the S combined data chip streams and provides T output chip streams, one output chip stream for each antenna at the base station. The space-time scrambling may also be called spatial spreading, pseudo-random transmit steering, matrix pseudo-random steering, and so on. The space-time scrambling may be performed in various manners. In an embodiment, space-time scrambling is performed with matrix multiplication. For this embodiment, the S data chip streams are multiplied with different matrices and mapped to the T physical antennas. In another embodiment, space-time scrambling is performed based on a space-time code. The space-time code receives a block of data chips from the S streams, maps the data chips to physical antennas based on a linear or non-linear mapping scheme, and provides output chips for the T physical antennas.

For the embodiment shown in FIG. 5A, the data chip streams from the data processors for different physical channels are combined by combiner 530 and then space-time scrambled by unit 538. For this embodiment, space-time scrambling is performed for the physical channels that are combined by combiner 530.

Figure 5B:
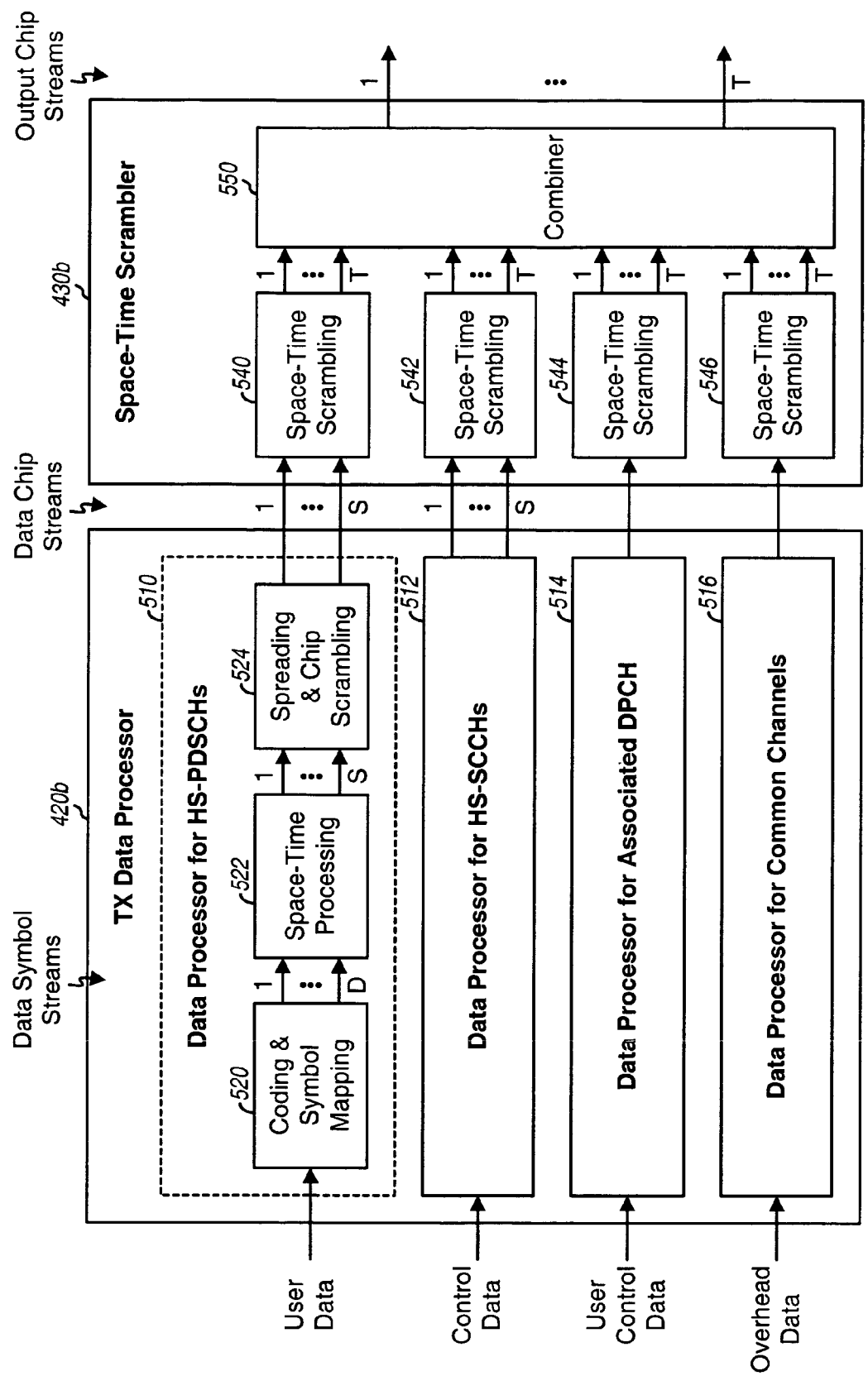

FIG. 5B shows a block diagram of a TX data processor 420b and a space-time scrambler 430b, which are another embodiment of TX data processor 420 and space-time scrambler 430, respectively, at base station 110. For this embodiment, TX data processor 420b includes data processors 510, 512, 514 and 516, which are described above for FIG. 5A. Space-time scrambler 430b includes space-time scrambling units 540, 542, 544 and 546 that perform space-time scrambling for the data chip streams from data processors 510, 512, 514 and 516, respectively. A combiner 550 combines the output streams from all space-time scrambling units 540, 542, 544 and 546 and provides T output chip streams for the T physical antennas. For the embodiment shown in FIG. 5B, space-time scrambling may be selectively applied on each type of physical channel and on each physical channel of a given channel type by controlling the operation of the space-time scrambling unit for that channel type.

The space-time scrambling may also be performed in other manners. For example, the physical channels to be space-time scrambled may be combined first, then space-time scrambled, and then combined with physical channels that are not space-time scrambled. As another example, the space-time scrambling may be incorporated within TX data processor 420, e.g., performed before or after the spreading.

Figure 6:
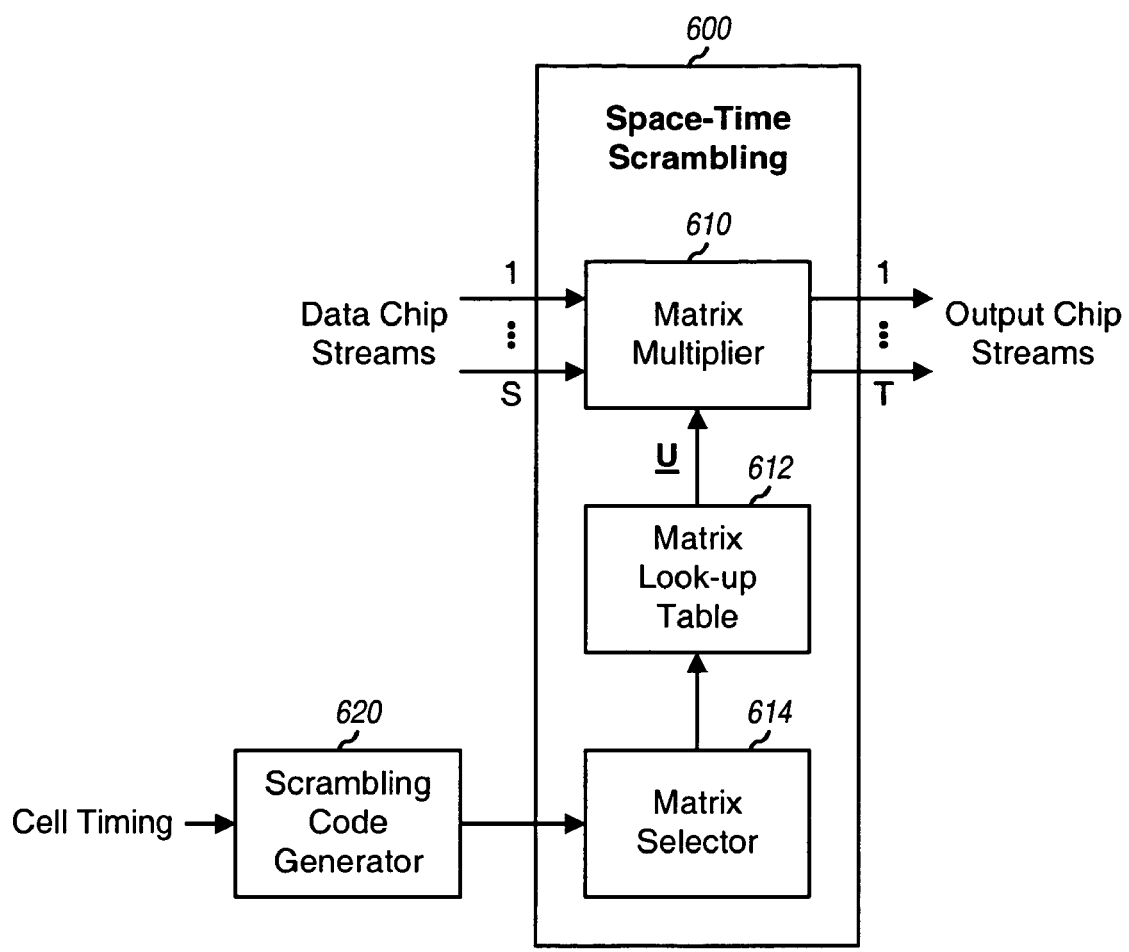
FIG. 6 shows a block diagram of a space-time scrambling unit.

FIG. 6 shows an embodiment of a space-time scrambling unit 600, which performs space-time scrambling using matrix multiplication. Space-time scrambling unit 600 may be used for space-time scrambling unit 538 in FIG. 5A and for each of space-time scrambling units 540, 542, 544 and 546 in FIG. 5B. Space-time scrambling unit 600 receives the S (combined or uncombined) data chip streams from TX data processor 420 and processes and maps these data chip streams to the T physical antennas.

Within space-time scrambling unit 600, a matrix multiplier 610 receives S data chips from the S streams in each chip period, multiplies these S data chips with a matrix, and provides T output chips for that chip period. Matrix multiplier 610 may perform space-time scrambling for each chip period n, as follows:

$$\underline{x}(n) = \underline{U}(n) \cdot \underline{s}(n), \quad \text{Eq (1)}$$

where $\underline{s}(n)$ is a T×1 vector containing S data chips for chip period $\bar{n}$ and T−S zeros, $\underline{U}(n)$ is a T×T matrix used for space-time scrambling in chip period n, and $\underline{x}(n)$ is a T×1 vector containing T output chips for chip period n.

Each data chip stream may be mapped to one entry of vector $\underline{s}(n)$, and the remaining entries of $\underline{s}(n)$ may be filled with zeros. Each entry of $\underline{s}(n)$ is multiplied with a respective column of matrix $\underline{U}(n)$ to obtain a vector, and the S vectors obtained based on the S non-zero entries of $\underline{s}(n)$ are added to obtain vector $\underline{x}(n)$. Only S columns of $\underline{U}(n)$ are used, and the other T−S columns of $\underline{U}(n)$ are multiplied with zeros and thus effectively not used. $\underline{U}(n)$ may be set equal to the identity matrix $\underline{I}$, or $\underline{U}(n)=\underline{I}$, to disable space-time scrambling.

A given matrix $\underline{U}(n)$ may be used for one chip period, multiple chip periods, one symbol period, multiple symbol periods, one slot, and so on. The chip scrambling by unit 524 in FIGS. 5A and 5B may be disabled if the matrix is updated at the chip rate and different matrices are used for different chip periods. Space-time spreading and scrambling is achieved if multiple matrices are used for each symbol period, so that each data symbol is spread and scrambled over both space and time. In this case, the spreading by unit 524 in FIGS. 5A and 5B and the space-time scrambling by matrix multiplier 610 in FIG. 6 may be implemented with a joint space-time spreading and scrambling unit.

In an embodiment, the matrices used for space-time scrambling are generated as needed. In another embodiment, which is shown in FIG. 6, a set of matrices is pre-computed and stored in a matrix look-up table (LUT) 612. A matrix selector 614 then selects a specific matrix to use for space-time scrambling in each chip period from among the available matrices. The matrix selection may be performed in various manners, as described below.

Various types of matrices may be used for the space-time scrambling. In an embodiment, unitary matrices are used for space-time scrambling. A unitary matrix $\underline{U}$ is characterized by the property $\underline{U}^H \cdot \underline{U} = \underline{I}$, where "$H$" denotes a conjugate transpose. The columns of a unitary matrix are orthogonal to one another, and each column has unit power. The use of unitary matrices may simplify space-time descrambling by the terminals. In another embodiment, matrices that are not unitary or orthogonal are used for space-time scrambling.

The matrices used for space-time scrambling may be generated in various manners. In an embodiment, the matrices are generated based on a unitary base matrix and a set of scalars. The rows of the base matrix may be multiplied with different combinations of scalars to obtain different matrices for space-time scrambling. Each scalar may be a real or complex value, e.g., +1, −1, +j, −j, and so on, where $j=\sqrt{-1}$. The scalars may be selected to have unit magnitude so that the matrices generated with these scalars are unitary matrices. The base matrix may be a Walsh matrix or a Hadamard matrix. A 2×2 Walsh matrix $\underline{W}_{2\times 2}$ and a larger size Walsh matrix $\underline{W}_{2N\times 2N}$ may be given as:

$$\underline{W}_{2\times 2} = \begin{bmatrix} 1 & 1 \\ 1 & -1 \end{bmatrix} \text{ and } \underline{W}_{2N\times 2N} = \begin{bmatrix} \underline{W}_{N\times N} & \underline{W}_{N\times N} \\ \underline{W}_{N\times N} & -\underline{W}_{N\times N} \end{bmatrix}. \quad \text{Eq (2)}$$

Walsh matrices have dimensions that are powers of two, e.g., 2, 4, 8, and so on.

The base matrix may also be a Fourier matrix. For a T×T Fourier matrix $\underline{F}_{T\times T}$, the element in the n-th row and m-th column of $\underline{F}_{T\times T}$, $f_{n,m}$, may be expressed as:

$$f_{n,m} = e^{-j2\pi\frac{(n-1)(m-1)}{T}}, \text{ for } n=1,\ldots,T \text{ and } m=1,\ldots,T. \quad \text{Eq (3)}$$

Fourier matrices of any square dimension (e.g., 2, 3, 4, 5, and so on) may be formed. Other matrices may also be used as the base matrix.

The matrices used for space-time scrambling may also be generated in other manners. For example, the matrices may be defined based on the scrambling code for the base station. As another example, the matrices may be generated based on a search for matrices that can provide good performance.

In an embodiment, the space-time scrambling is performed in a deterministic manner without requiring either feedback from the recipient terminals or knowledge of the wireless channels for these terminals. For example, a predetermined sequence of matrices may be used for the matrix multiplication. This matrix sequence is known to both the base station and the recipient terminals.

The sequence of matrices used for space-time scrambling may be formed based on the set of matrices available for space-time scrambling. In an embodiment, the matrices in the set are selected in a sequential order, and each selected matrix is used for space-time scrambling for a predetermined time interval. This time interval is also called the scrambling interval. In an embodiment, neighboring base stations start with the same matrix at a reference time (e.g., at the start of each frame), and these base stations use the same sequence of matrices for space-time scrambling. In another embodiment, neighboring base stations start with different matrices at the reference time, and these base stations use different sequences of matrices for space-time scrambling. In yet another embodiment, neighboring base stations use different sequences of matrices but start with same matrix. For example, one base station may use a matrix sequence of {A, B, D, C, . . . } and another base station may use a matrix sequence of {A, C, B, D, . . . }, where A, B, C and D are different matrices. The use of different sequences of matrices may randomize intra-cell interference, which is the interference observed by the terminals in a given cell from the base stations for the neighbor cells.

In another embodiment, the matrices in the set are selected in a pseudo-random manner (e.g., based on the scrambling code for the base station), and each selected matrix is used for space-time scrambling for a predetermined time interval. For example, the set may contain $2^L$ matrices that are assigned indices of 0 through $2^L-1$, where L may be equal to 1, 2, 3, 4, or some other integer. L bits of the scrambling code may then be used to select one of the $2^L$ matrices in the set. At the start of each scrambling interval, the L most significant bits (MSBs), the L least significant bits (LSBs), or some other L bits of the scrambling code may be used as an L-bit index to look-up table 612. Table 612 would then provide the matrix with this L-bit index. This embodiment provides several advantages. First, since the terminals are synchronized to the scrambling code of the serving base station, this embodiment provides a simple method to determine the matrices used by the base station for space-time scrambling. Second, neighboring base stations are assigned different scrambling codes and hence use different sequences of matrices that are uncorrelated, which may randomize inter-cell interference. Third, a terminal can ascertain the matrices used by its serving base station as well as the matrices used by the neighbor base stations for which the terminal has timing information. The identity and timing of each base station may be ascertained by demodulating the common pilot transmitted by that base station on the CPICH.

In general, neighboring base stations may use the same or different sequences of matrices for space-time scrambling. For example, neighboring base stations may use a common sequence of matrices for broadcast and other common channels and may use different sequences of matrices for other physical channels (e.g., for HSDPA). The same or different sequences may also be used for different channel conditions. For example, neighboring base stations may use the same sequence of matrices when transmitting to terminals with high Doppler and may use different sequences of matrices when transmitting to terminals with low Doppler.

In general, a terminal may determine the matrices used for space-time scrambling by a given base station based on (1) information that is continually transmitted by the base station (e.g., the scrambling code), (2) signaling sent by the base station, (3) broadcast information sent by the base stations in the cellular system, and/or (4) information available at the terminal. The terminal may perform advance receiver processing based on knowledge of the matrices used by the serving and neighbor base stations in order to suppress or possibly cancel inter-cell interference. The terminal may also use this knowledge in order to combine transmissions sent by multiple base stations with space-time scrambling.

The update rate for the matrices is related to the scrambling interval and may be flexibly selected. In an embodiment, the update rate is once per chip, and a different matrix is selected for each chip period. For this embodiment, the chip scrambling may be omitted. In another embodiment, the update rate is once per data symbol, and a different matrix is selected for each symbol period, which is 16 chips for the HS-PDSCHs. In yet another embodiment, the update rate is once per multiple (Q) data symbols, and a different matrix is selected for each Q-symbol interval. In yet another embodiment, the update rate is once per slot, and a different matrix is selected for each slot. In general, the update rate may be selected such that multiple matrixes are used for a code block, which is sent in one TTI for the HS-PDSCHs. Space-time scrambling provides diversity for a multi-antenna transmission to the recipient terminals and further randomizes this transmission so that other terminals do not suffer reduced measurement reliability due to the interference from this transmission. Hence, the scrambling matrix should be updated several times per code block length (in order to provide diversity) and several times per measurement interval (in order to reduce the degradation in measurement reliability).

The matrices may be selected for use in a periodic manner. A sequence of matrices selected for use is called a cycle. A sequence may include different matrices or may include multiple instances of a given matrix. The smallest periodicity by which the matrices are selected is called a cycle period or cycle length. In an embodiment, the cycle period is equal to one frame. This embodiment facilitates the selection of matrices based on the scrambling code, which restarts at the beginning of each frame. In another embodiment, the cycle period is less than a frame. For example, the cycle period may be equal to a TTI, a slot, or some other duration. This embodiment may reduce the number of matrices needed for space-time scrambling. In yet another embodiment, the cycle length is more than a frame.

Space-time scrambling may be selectively applied across time, code, and so on. In an embodiment, space-time scrambling is selectively applied for each TTI. Signaling (e.g., a bit) may be sent for each TTI to indicate whether or not space-time scrambling is performed in that TTI. In another embodiment, space-time scrambling is applied for only certain pre-defined TTIs of a frame. For example, space-time scrambling may be (1) performed for TTIs in which the recipient terminals are able to perform space-time descrambling and (2) omitted for TTIs in which the recipient terminals that are unable to perform space-time descrambling are served. The base station may send signaling to indicate which TTIs have space-time scrambling applied.

In yet another embodiment, space-time scrambling is applied on only certain physical channels. For example, space-time scrambling may be applied on the HS-PDSCHs and not applied on other physical channels. Table 2 lists some scenarios for applying space-time scrambling and the matrix update rate for each scenario. If space-time scrambling is applied on all physical channels for HSDPA, which are the HS-PDSCHs, HS-DSCHs, associated DPCH, and common channels, then the matrices may be updated at any rate, e.g., once per chip or less frequently. If space-time scrambling is applied on only some physical channels for HSDPA (e.g., the HS-PDSCHs, HS-DSCHs, and/or associated DPCH), then the matrices may be updated at a rate of once per shortest symbol period for these physical channels or less frequently. The shortest symbol period is determined by the shortest spreading factor for all physical channels applied with space-time scrambling. If space-time scrambling is applied on only some physical channels, then the update rate may be set to one or multiple times the smallest spreading factor in order to preserve orthogonality among these physical channels.

TABLE 2

| Space-time scrambling applied on . . . | Matrix update rate |
| --- | --- |
| All physical channels | Chip rate or less frequent |
| HS-PDSCHs, HS-DSCHs, and associated DPCH | Shortest symbol rate or less frequent (one or multiple times the smallest spreading factor) |
| HS-PDSCHs | Shortest symbol rate or less frequent |

In general, space-time scrambling may be selectively applied on physical channels and/or selectively applied across time. Space-time scrambling may be selectively applied for compatibility reasons, so that the performance of terminals that do not support space-time scrambling is not degraded. Space-time scrambling may be selectively applied based on a predetermined scheme, based on feedback information from the terminals, and so on.

In an embodiment, each base station is associated with one sequence of matrices. This matrix sequence may be used for space-time scrambling for any and all physical channels.

In another embodiment, each base station is associated with multiple sequences of matrices, which may be generated and used in various manners. In an embodiment, each matrix sequence is generated by cycling through the set of matrices in a different order. In another embodiment, each matrix sequence is generated with a different set of matrices or a different subset of one set of matrices. Different matrix sequences may be used for different slots of a given TTI, different TTIs of a given frame, different frames, and so on. Different matrix sequences may also be used for different physical channels or different types of physical channels.

In yet another embodiment, each base station is associated with different matrix sequences that can provide different performance for different channel conditions. A matrix sequence may be selected for use based on feedback from the terminals. For example, the terminals may measure received signal qualities for different matrix sequences and may send back the matrix sequence with the best received signal quality. As another example, the base station may cycle through the different matrix sequences and select the matrix sequence with the most favorable feedback, e.g., the fastest acknowledgments (ACKs) from the terminals for correctly decoded packets. The terminals may be informed of the matrix sequence used for space-time scrambling.

Space-time scrambling randomizes the transmission of the D data symbol streams and results in stable and similar transmission performance for these data symbol streams. The stable and similar performance may allow for a reduction in the feedback from the terminals. A terminal receiving HSDPA typically measures the received signal quality based on the CPICH, determines a channel quality indicator (CQI) based on the received signal quality measurement, and sends the CQI back to the serving base station. The base station may select an appropriate coding and modulation scheme for the terminal based on the reported CQI. With space-time scrambling, the terminal may send the CQI at a lower rate, e.g., only once every several TTIs, once per frame, and so on.

For the embodiments described above, space-time scrambling is performed using matrix multiplication. Space-time scrambling may also be performed using a space-time code or a set of space-time codes. Each space-time code may map a block of data chips to the T transmit antennas based on a specific mapping scheme. The mapping for each space-time code may be such that (1) each block of K data chips is sent in a K-chip interval, where K>1, (2) all or as many of the K data chips are sent from the T transmit antennas in each chip period, and/or (3) each data chip is sent from all or as many of the T transmit antennas over the K-chip interval. Different mappings may be used for different space-time codes.

Figures 7, 8:
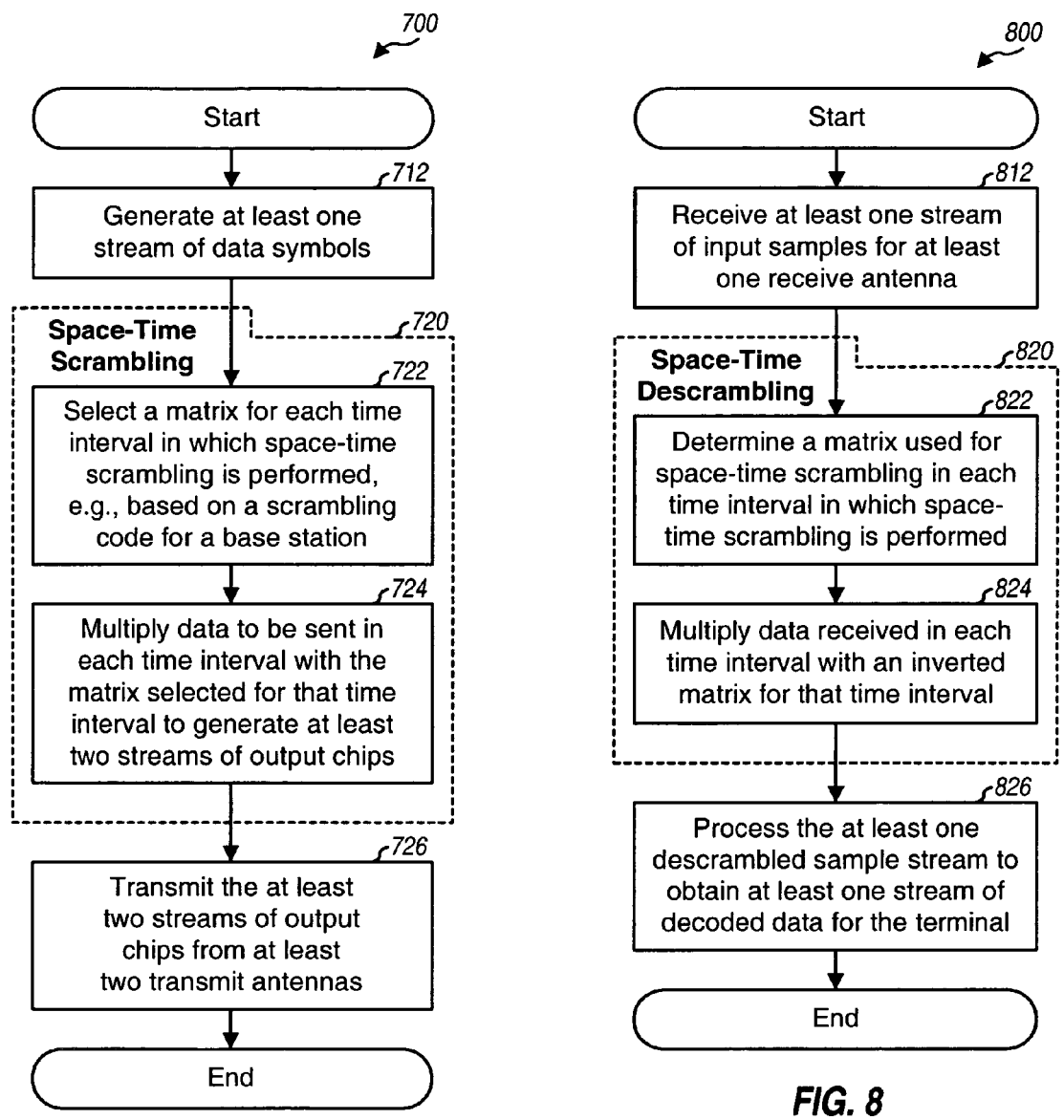
FIG. 7 shows a process to transmit data with space-time scrambling.
FIG. 8 shows a process to receive data sent with space-time scrambling.

FIG. 7 shows a process 700 performed by a transmitter (e.g., a base station) to transmit data with space-time scrambling. At least one stream of data symbols is generated, e.g., by encoding, interleaving, and symbol mapping blocks of data (block 712). The data symbol stream(s) may be mapped to one or more physical channels and spread with channelization codes assigned to the physical channels.

Space-time scrambling is performed on the at least one stream of data symbols to generate at least two streams of output chips (block 720). The space-time scrambling may be achieved by performing matrix multiplication with a sequence of matrices (as shown in FIG. 7) or by using space-time codes (not shown in FIG. 7). For space-time scrambling with matrix multiplication, a matrix is selected for each time interval in which space-time scrambling is performed, e.g., based on the scrambling code for the base station (block 722). Data to be sent in each time interval is then multiplied with the matrix selected for that time interval (block 724). The matrices used for space-time scrambling may be defined and selected in various manners, as described above. The streams of output chips are processed and transmitted from respective transmit antennas (block 726).

A terminal performs the complementary space-time descrambling to recover a multi-antenna transmission sent with space-time scrambling. Each base station transmits a Primary Synchronization Channel (SCH) and a Secondary SCH that are not scrambled and may be used for initial acquisition. The terminal may perform acquisition for a base station based on the SCHs transmitted by that base station. The terminal may obtain the timing of the base station and determine the sequence of matrices used by the base station for space-time scrambling. The terminal may perform space-time descrambling based on the sequence of matrices in order to invert the physical channels that have been space-time scrambled. For each scrambling interval, the terminal may perform matrix multiplication with an inverted matrix $U^{-1}$, which is equal to $U^H$ if U is a unitary matrix. The terminal is able to perform space-time descrambling even if the space-time scrambling changes at a fast rate (e.g., every chip or every symbol). Alternatively, the terminal may perform space-time equalization, which is a combination of equalization and space-time descrambling that are performed jointly.

FIG. 8 shows a process 800 performed by a receiver (e.g., a terminal) to receive data sent with space-time scrambling. At least one stream of input samples is received for at least one receive antenna (block 812). Space-time descrambling is then performed on the at least one input sample stream to obtain at least one stream of descrambled samples (block 820). The space-time descrambling may be achieved by performing matrix multiplication with a sequence of matrices (as shown in FIG. 8) or by performing space-time decoding (not shown in FIG. 8). For each time interval in which space-time scrambling is performed, a matrix used for space-time scrambling in that time interval is determined, e.g., based on the scrambling code for the base station (block 822). Data received in each time interval is multiplied with an inverted matrix for that time interval (block 824). The at least one descrambled sample stream is further processed (e.g., despread, demodulated, deinterleaved, and decoded) to obtain at least one decoded data stream for the terminal (block 826).

The space-time scrambling techniques described herein may be implemented by various means. For example, these techniques may be implemented in hardware, software, firmware, or a combination thereof. For a hardware implementation, the processing units that perform space-time scrambling at a transmitter may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The processing units that perform space-time descrambling at a receiver may also be implemented within one or more ASICs, DSPs, processors, and so on.

For a software and/or firmware implementation, the techniques described herein may be implemented with modules (e.g., procedures, functions, and so on) that perform the functions described herein. The software and/or firmware codes may be stored in a memory (e.g., memory 442, 482x, or 482y in FIG. 4) and executed by a processor (e.g., processor 440, 480x, or 480y). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A base station apparatus comprising:
a processor operative to:
generate at least one stream of data symbols;
identify a set of bits associated with space-time scrambling in a current value of a pseudo-random scrambling code associated with the base station apparatus;
identify a current space-time scrambling matrix from a look-up table of space-time scrambling matrices based on the set of bits; and
perform a matrix multiplication based on the current space-time scrambling matrix and the at least one stream of data symbols to space-time scramble the at least one stream of data symbols into at least two streams of output chips; and
at least two transmitter units operative to transmit the at least two streams of output chips from at least two antennas to at least one receiver in a cellular system.

2. The apparatus of claim 1, wherein, for each time interval in which space-time scrambling is performed, the processor is operative to select the space-time scrambling matrix from among the matrices of the look-up table and to perform matrix multiplication with the selected matrix.

3. The apparatus of claim 1, wherein the processor is operative to perform space-time scrambling using at least one space-time code, each space-time code corresponding to a different mapping of data symbols to antennas and symbol periods.

4. The apparatus of claim 1, wherein the processor is operative to map the at least one stream of data symbols to at least one physical channel and to perform spreading for at least one physical channel with at least one channelization code.

5. The apparatus of claim 1, wherein the processor is operative to selectively perform space-time scrambling based on capability of the at least one receiver.

6. The apparatus of claim 1, wherein the cellular system is a Code Division Multiple Access (CDMA) system.

7. The apparatus of claim 1, wherein the cellular system is a Wideband Code Division Multiple Access (W-CDMA) system.

8. The apparatus of claim 1, wherein the processor is further operative to select different sequences of space-time scrambling matrices for at least two consecutive blocks of the at least one stream by cycling through a set of space-time scrambling matrices associated with the apparatus in a different order for the respective at least two consecutive blocks.

9. The apparatus of claim 1, wherein the processor is further operative to select a sequence of space-time scrambling matrices for the matrix multiplication of a given block based on a determination of a fastest acknowledgement (ACK) from the at least one receiver.

10. A method comprising:
generating at least one stream of data symbols;
identifying a set of bits associated with space-time scrambling in a current value of a pseudo-random scrambling code associated with a base station;
identifying a current space-time scrambling matrix from a look-up table of space-time scrambling matrices based on the set of bits;
performing a matrix multiplication based on the current space-time scrambling matrix and the at least one stream of data symbols to space-time scramble the at least one stream of data symbols into at least two streams of output chips; and
transmitting the at least two streams of output chips from at least two antennas to at least one receiver in a cellular system.

11. The method of claim 10, further comprising:
mapping the at least one stream of data symbols to at least one physical channel; and
performing spreading for the at least one physical channel with at least one channelization code.

12. A base station apparatus comprising:
means for generating at least one stream of data symbols;
means for identifying a set of bits associated with space-time scrambling in a current value of a pseudo-random scrambling code associated with the base station apparatus;
means for identifying a current space-time scrambling matrix from a look-up table of space-time scrambling matrices based on the set of bits;
means for performing a matrix multiplication based on the current space-time scrambling matrix and the at least one stream of data symbols to space-time scramble the at least one stream of data symbols into at least two streams of output chips;
means for transmitting the at least two streams of output chips from at least two antennas to at least one receiver in a cellular system.

13. The base station apparatus of claim 12, further comprising:
means for mapping the at least one stream of data symbols to at least one physical channel; and
means for performing spreading for the at least one physical channel with at least one channelization code.

14. A base station apparatus, comprising:
a processor operative to
generate at least one stream of data symbols for at least one terminal in a wireless communication systems;
identify a set of bits associated with space-time scrambling in a current value of a pseudo-random scrambling code associated with the base station apparatus;
identify a current space-time scrambling matrix from a look-up table of space-time scrambling matrices based on the set of bits;
perform a matrix multiplication based on the current space-time scrambling matrix and the at least one stream of data symbols to space-time scramble the at least one stream of data symbols according to a sequence of space-time scrambling matrices into at least two streams of output chips for transmission via at least two antennas, wherein neighboring base stations in the wireless communication system use different sequences of matrices for space-time scrambling;
wherein different sequences of space-time scrambling matrices are used to space-time scramble at least two consecutive blocks of the at least one stream of data symbols; and
a memory coupled to the processor.

15. The apparatus of claim 14, wherein the base station is associated with multiple sequences of matrices, and wherein the sequence of matrices used for space-time scrambling is selected from among the multiple sequences of matrices.

16. The apparatus of claim 15, wherein the multiple sequences of matrices provide different performance in different channel conditions.

17. The apparatus of claim 14, further comprising:
a controller operative to receive feedback from the at least one terminal and to select one sequence of matrices from among multiple sequences of matrices based on the received feedback, wherein the selected sequence of matrices is used by the processor for space-time scrambling.

18. The apparatus of claim 14, wherein the sequence of matrices has a predetermined duration and repeats periodically.

19. The apparatus of claim 14, wherein the sequence of matrices has a duration of one frame or less in a Code Division Multiple Access (CDMA) system.

20. A method comprising:
generating at least one stream of data symbols for at least one terminal in a wireless communication system;
identifying a set of bits associated with space-time scrambling in a current value of a pseudo-random scrambling code associated with a base station;
identifying a current space-time scrambling matrix from a look-up table of space-time scrambling matrices based on the set of bits;
performing a matrix multiplication based on the current space-time scrambling matrix and the at least one stream of data symbols to space-time scramble the at least one stream of data symbols according to a sequence of space-time scrambling matrices into at least two streams of output chips for transmission via at least two antennas, wherein neighboring base stations in the wireless communication system use different sequences of matrices for space-time scrambling; and
wherein different sequences of matrices are used to space-time scramble at least two consecutive blocks of the at least one stream of data symbols.

21. A base station apparatus comprising:
means for generating at least one stream of data symbols for at least one terminal in a wireless communication system;
means for identifying a subset of bits associated with space-time scrambling in a current value of a pseudo-random scrambling code associated with the base station apparatus;
means for identifying a current space-time scrambling matrix from a look-up table of space-time scrambling matrices based on the subset of bits; and
means for performing a matrix multiplication based on the current space-time scrambling matrix and the at least one stream of data symbols to space-time scramble the at least one stream of data symbols according to a sequence of space-time scrambling matrices into at least two streams of output chips for transmission via at least two antennas, wherein neighboring base stations in the wireless communication system use different sequences of matrices for space-time scrambling;

wherein different sequences of matrices are used to space-time scramble at least two consecutive blocks of the at least one stream of data symbols.

22. A base station apparatus, comprising:
a processor operative to
generate at least one stream of data symbols for at least one terminal;
map the at least one stream of data symbols to at least one physical channel;
perform spreading for the at least one physical channel with at least one channelization code to generate at least one stream of data chips;
identify a set of bits associated with space-time scrambling in a current value of a pseudo-random scrambling code associated with the base station apparatus;
identify a current space-time scrambling matrix from a look-up table of space-time scrambling matrices based on the set of bits; and
perform a matrix multiplication based on the current space-time scrambling matrix and the at least one stream of data chips to space-time scramble the at least one stream of data chips into at least two streams of output chips for transmission via at least two antennas;
wherein different sequences of space-time scrambling matrices are used to perform space-time scrambling on at least two consecutive blocks of the at least one stream of data symbols; and
a memory coupled to the processor.

23. The apparatus of claim 22, wherein for each time interval in which space-time scrambling is performed the processor is operative to select the space-time scrambling matrix from among the matrices associated with the look-up table and to perform matrix multiplication with the selected matrix.

24. The apparatus of claim 23, wherein each time interval corresponds to a chip period, and wherein the processor is operative to select the space-time scrambling matrix from among the plurality of matrices in each chip period.

25. The apparatus of claim 23, wherein each time interval corresponds to a symbol period, and wherein the processor is operative to select a new space-time scrambling matrix from among the matrices associated with the look-up table in each symbol period.

26. The apparatus of claim 22, wherein the processor is operative to perform space-time scrambling for all physical channels being transmitted by the base station.

27. The apparatus of claim 22, wherein the at least one stream of data symbols is for High-Speed Downlink Packet Access (HSDPA) in Wideband Code Division Multiple Access (W-CDMA).

28. The apparatus of claim 27, wherein the processor is operative to perform space-time scrambling for High Speed Physical Downlink Shared Channels (HS-PDSCHs).

29. The apparatus of claim 28, wherein the processor is further operative to perform space-time scrambling for Shared Control Channels for High Speed Downlink Shared Channels (HS-DSCH) (HS-SCCHs).

30. The apparatus of claim 28, wherein the processor is further operative to perform space-time scrambling for a Primary Common Control Physical Channel (P-CCPCH) and a Common Pilot Channel (CPICH).

31. The apparatus of claim 28, wherein the processor is further operative to perform space-time scrambling for a downlink Dedicated Physical Channel (DPCH).

32. A base station apparatus, comprising:
a processor operative to:
process a plurality of blocks of data to generate at least one stream of data symbols for at least one terminal, each block of data being sent in a transmission time interval (TTI);
map the at least one stream of data symbols to at least one physical channel;
perform spreading for the at least one physical channel with at least one channelization code to generate at least one stream of data chips;
identify a set of bits associated with space-time scrambling in a current value of a pseudo-random scrambling code associated with the base station apparatus;
identify a current space-time scrambling matrix from a look-up table of space-time scrambling matrices based on the set of bits; and
perform a matrix multiplication of the current space-time scrambling matrix and the at least one stream of data symbols to space-time scramble the at least one stream of data chips into at least two streams of output chips for transmission via at least two antennas;
wherein the processor is operative to selectively perform space-time scrambling for each of a plurality of TTIs such that space-time scrambling is not performed for at least one of the plurality of TTIs,
wherein each TTI comprises multiple time intervals,
wherein for each time interval in which space-time scrambling is performed the processor is operative to select a new space-time scrambling matrix from among the space-time scrambling matrices associated with the look-up table based on the scrambling code and to perform matrix multiplication on the at least one stream of data chips with the selected new space-time scrambling matrix; and
a memory coupled to the processor.

33. The apparatus of claim 32, wherein the processor is operative to selectively perform space-time scrambling on TTIs that serve terminals capable of performing space-time descrambling, and to omit space-time descrambling on TTIs that serve terminals not capable of performing space-time descrambling.

34. The apparatus of claim 32, wherein the processor is operative to send signaling for respective TTIs in the plurality of TTIs indicating whether space-time scrambling has been performed for the respective TTIs.

35. A method comprising:
generating at least one stream of data symbols for at least one terminal;
mapping the at least one stream of data symbols to at least one physical channel;
performing spreading for the at least one physical channel with at least one channelization code to generate at least one stream of data chips;
identifying a set of bits associated with space-time scrambling in a current value of a pseudo-random scrambling code associated with a base station;
identifying a current space-time scrambling matrix from a look-up table of space-time scrambling matrices based on the set of bits; and
performing a matrix multiplication of the current space-time scrambling matrix and the at least one stream of data chips to space-time scramble the at least one stream of data chips into at least two streams of output chips for transmission via at least two antennas;

wherein different sequences of space-time scrambling matrices are used to space-time scramble at least two consecutive blocks of the at least one stream of data chips.

36. The method of claim 35, wherein the at least one stream of data symbols is for High-Speed Downlink Packet Access (HSDPA), and wherein space-time scrambling is performed for High Speed Physical Downlink Shared Channels (HS-PDSCHs).

37. A base station apparatus comprising:
   means for generating at least one stream of data symbols for at least one terminal;
   means for mapping the at least one stream of data symbols to at least one physical channel;
   means for performing spreading for the at least one physical channel with at least one channelization code to generate at least one stream of data chips;
   means for identifying a set of bits associated with space-time scrambling in a current value of a pseudo-random scrambling code;
   means for identifying a current space-time scrambling matrix from a look-up table of space-time scrambling matrices based on the set of bits; and
   means for performing a matrix multiplication of the current space-time scrambling matrix and the at least one stream of data chips to space-time scramble the at least one stream of data chips into at least two streams of output chips for transmission via at least two antennas;
   wherein different sequences of matrices are used to space-time scramble at least two consecutive blocks of the at least one stream of data chips.

38. The apparatus of claim 37, wherein the at least one stream of data symbols is for High-Speed Downlink Packet Access (HSDPA), and wherein space-time scrambling is performed for High Speed Physical Downlink Shared Channels (HS-PDSCHs).

39. An apparatus comprising:
   at least one receiver unit operative to:
      receive at least two streams of output chips from a transmitter in a cellular system and to generate at least one stream of input samples; and
   a processor operative to:
      identify a set of bits associated with space-time scrambling in a current value of a pseudo-random scrambling code associated with the transmitter;
      identify a current space-time scrambling matrix from a look-up table of space-time scrambling matrices based on the set of bits;
      perform a matrix multiplication based on the current space-time scrambling matrix and the at least one stream of input samples to space-time descramble the at least one stream of input samples into at least one stream of descrambled samples; and
      process the at least one stream of descrambled samples to obtain an estimate of at least one stream of data symbols.

40. The apparatus of claim 39, wherein the processor is operative to perform despreading on the at least one stream of descrambled samples for at least one physical channel with at least one channelization code to obtain at least one stream of despread symbols.

41. A method comprising:
   obtaining at least one stream of input samples for at least two streams of output chips received from a transmitter in a cellular system;
   identifying a set of bits associated with space-time scrambling in a current value of a pseudo-random scrambling code associated with the transmitter;
   identifying a current space-time scrambling matrix from a look-up table of space-time scrambling matrices based on the set of bits;
   performing a matrix multiplication based on the current space-time scrambling matrix and the at least one stream of input samples to space-time descramble the at least one stream of input samples into at least one stream of descrambled samples; and
   processing the at least one stream of descrambled samples to obtain an estimate of at least one stream of data symbols.

42. An apparatus comprising:
   means for obtaining at least one stream of input samples for at least two streams of output chips received from a transmitter in a cellular system;
   means for identifying a set of bits associated with space-time scrambling in a current value of a scrambling code associated with the transmitter;
   means for identifying a current space-time scrambling matrix from a look-up table of space-time scrambling matrices based on the set of bits;
   means for performing a matrix multiplication based on the current space-time scrambling code matrix and the at least one stream of input samples to space-time descramble the at least one stream of input samples into at least one stream of descrambled samples; and
   means for processing the at least one stream of descrambled samples to obtain an estimate of at least one stream of data symbols.

43. A non-transitory computer-readable storage medium having stored thereon computer-executable instructions for:
   generating at least one stream of data symbols;
   identifying a set of bits associated with space-time scrambling in a current value of a continually updated pseudo-random scrambling code;
   identifying a current space-time scrambling matrix from a look-up table of space-time scrambling matrices based on the set of bits; and
   performing a matrix multiplication based on the current space-time scrambling matrix and the at least one stream of data symbols to space-time scramble the at least one stream of data symbols into at least two streams of output chips.

44. The computer-readable storage medium of claim 43, the computer-executable instructions further for:
   mapping the at least one stream of data symbols to at least one physical channel; and
   performing spreading for the at least one physical channel with at least one channelization code.

* * * * *